J. T. CLARK.
VEHICLE TIRE.
APPLICATION FILED JUNE 7, 1913.
1,079,397.
Patented Nov. 25, 1913.
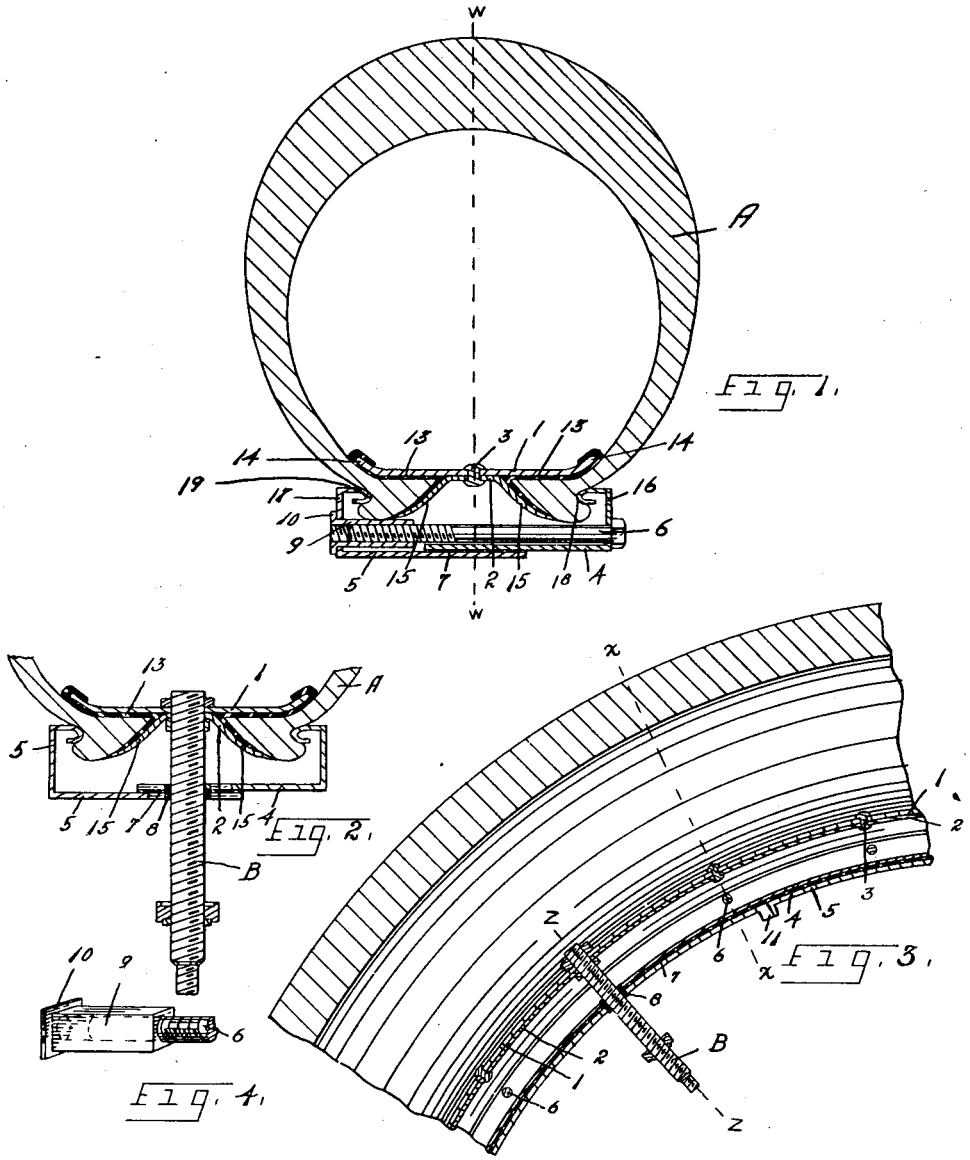
WITNESSES:
F. W. Thomas.
A. Maxwell
John T Clark
INVENTOR.
BY J. M. Thomas
ATTORNEY.

UNITED STATES PATENT OFFICE.

JOHN T. CLARK, OF PROVO, UTAH.

VEHICLE-TIRE.

1,079,397.  Specification of Letters Patent.  Patented Nov. 25, 1913.

Application filed June 7, 1913. Serial No. 772,455.

*To all whom it may concern:*

Be it known that I, JOHN T. CLARK, a citizen of the United States, residing at Provo city, in the county of Utah and State of Utah, have invented certain new and useful Improvements in Vehicle-Tires, of which the following is a specification.

My invention relates to vehicle tires, and has for its object to provide a pneumatic tire having no inner tube. This I do by providing a vehicle tire and means for fastening the edges of the tubular part of the tire to the other parts so closely that the tire may be inflated with compressed air directly within the outer casing or tube. Also to provide a fastening means for such outer casing which will render it air tight, easily and quickly secured in place or removed and in which casing slight punctures may be speedily and economically repaired. These objects I accomplish with the device illustrated in the accompanying drawings in which similar letters of reference indicate like parts throughout the several figures and described in the specification forming a part of the application, are pointed out in the appended claims.

In said drawings Figure 1 is a radial section cutting the tire on line *x x* of Fig. 3. Fig. 2 is a fragmentary section cutting the tire on line *z z* of Fig. 3. Fig. 3 is a fragmentary sectional view through the central plane of the tire, on line *w w* of Fig. 1. Fig. 4 is a view in perspective of one of the sleeve nuts.

In most of the pneumatic tires used on vehicles, such as automobiles and motor-cycles, the inflation of the tire is secured by means of compressed air within an inner tube, which expands and holds the outer tube, of the clencher type, in place. In my tire I use an outer casing A similar to that now used on said automobiles and motor-cycles. I insert within said casing A a metal band 1 having the edges outwardly flanged as at 14. Within said band 1 is rigidly secured a flared channel band 2 having the sides 15 thereof bent at an incline away from each other and slightly curved, in order that the space between said band 1 and said sides 15 will coincide with the edges of said casing A. Said bands 1 and 2 are fastened together and their meeting faces held in contact by the rivets 3. Two bands 4 and 5 partially telescoped and with flanges spaced apart are held concentrically within the band 2. They each have an outwardly extended flange shown at 16 and 17 respectively. Each of said flanges has its edge bent down parallel with the main part of the band and bent upon itself to form bead engaging annular lugs 18 and 19 respectively. Between said bands 4 and 5 a strip or band of flexible material 7 is fastened, preferably made of rubber, to prevent water and dust from entering the space between the said bands and the said casing A, and where the air valve B passes between said strip 7, flanges 8 are formed to be engaged by the edges of said bands 4 and 5 when drawn in contact. Alined openings are provided within said flanged portions 16 and 17, some of which are square and others circular, alternating in position to receive one of the bolts 6 or the square sleeve nuts 9, by means of which said flanges 16 and 17 are drawn closer together. Each of said nuts 9 has an outwardly extended flange 10. An air valve B is secured in said bands 1 and 2, a portion of which extends through an opening in said bands 4 and 5, by means of which air is forced to inflate the tire when assembled. V-shaped annular bands 13 made of flexible material, preferably rubber, are placed within the angled space between said bands 1 and 2 and the edges of said casing A and are drawn thereagainst, when said bolts 6 are screwed into said nuts 9, to seal the tubular space within said casing A. The edges of said V-shaped bands are formed to engage and lap over the edge of said flanges 14, to prevent chafing of the outer casing and to hold the side of the V-shaped band from being crowded within the apex of the angled space between said band 1 and flange 15. A transverse lug 11 is formed on the inner annular face of said band 5 to engage within a channel in the periphery of the rim of the wheel to prevent the tire from friction travel. When the edges of said casing, after having been coated with a sticky fluid where adjacent with said V-shaped band 13, are tightly drawn within the angled space between the band 1 and the flanges 15 by screwing the bolt 6 within the nuts 9, the space within said casing A will retain the air that is forced through the air valve B and the tire will be resilient, and the cost of the inner tube will be saved. Should a puncture occur, the casing A may be quickly removed and the puncture repaired on the inside of said casing, and the casing rendered air tight by re-assembling as before stated.

Having thus described my invention, I desire to secure by Letters Patent and claim:

1. A vehicle tire consisting of a casing having annular beads near each edge thereof; a metal band within said casing having its edges flanged outwardly; a channel band rigidly fastened within said metal band and having its edges inclined from each other; an air valve fastened through said metal band and said channel band; V-shaped annular bands made of flexible, compressible material adapted to be drawn in contact with said metal band and the sides of said channel band; two metal bands adapted to partially telescope and to engage said beads on said casing; a packing band between the last mentioned band; and bolts with nuts thereon to draw said last mentioned bands toward each other and hold the edges of said casing in contact with said V-shaped bands.

2. A vehicle tire consisting of a casing having annular beads near each edge thereof; a metal band within said casing having its edges flanged outwardly; a channel band rigidly fastened within said metal band and having its edges inclined from each other; an air valve fastened through said metal band and said channel band; V-shaped annular bands made of flexible, compressible material adapted to be drawn in contact with said metal band and the sides of said channel band; two metal bands adapted to partially telescope and to engage said beads on said casing; a packing band between the last mentioned bands; bolts through said last mentioned metal bands; and square sleeve nuts within which said bolts are screwed to draw the said last mentioned bands toward each other and hold the edges of said casing in contact with said V-shaped bands.

3. A vehicle tire consisting of a casing having annular beads near each edge thereof; a metal band within said casing having its edges flanged outwardly; a channel band rigidly fastened within said metal band and having its edges inclined from each other; an air valve fastened through said metal band and said channel band; V-shaped annular bands made of flexible, compressible material adapted to be drawn in contact with said metal band and the sides of said channel band; two metal bands adapted to partially telescope and to engage said beads on said casing; a packing band between the last mentioned bands; a radially extended transverse lug on the inner of said metal bands; and means to draw said last mentioned bands toward each other.

4. A vehicle tire consisting of a casing having annular beads near each edge thereof; a metal band having its edges flanged outwardly; a channel band rigidly fastened within said metal band and having its edges inclined from each other; an air valve fastened through said metal band and said channel band; V-shaped annular bands made of flexible, compressible material adapted to be drawn in contact with said metal band and the sides of channel band; two metal bands adapted to partially telescope and to engage said beads on said casing; outwardly extended flanges thereon; a packing band between said last mentioned bands; bolts inserted through said flanges; and square sleeve nuts within which said bolts are screwed to draw said last mentioned bands toward each other and to hold the V-shaped annular bands in close contact with said metal band and said channel band.

In testimony whereof I have affixed my signature in presence of two witnesses.

JOHN T. CLARK.

Witnesses:
SAM RANEY,
F. W. THOMAS.